(12) United States Patent
Mielgo et al.

(10) Patent No.: US 9,676,183 B1
(45) Date of Patent: Jun. 13, 2017

(54) DROP DETECTION WITH RIBS TO ALIGN EMITTERS AND DETECTORS

(71) Applicant: HEWLETT-PACKARD DEVELOPMENT COMPANY, L.P., Houston, TX (US)

(72) Inventors: Alejandro Mielgo, Sant Cugat del Valles (ES); Francisco Gomez, Sant Cugat del Valles (ES); Jordi Bas, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/208,178

(22) Filed: Jul. 12, 2016

(51) Int. Cl.
*B41J 2/045* (2006.01)
*G01V 8/20* (2006.01)

(52) U.S. Cl.
CPC ......... *B41J 2/0456* (2013.01); *B41J 2/04586* (2013.01); *G01V 8/20* (2013.01)

(58) Field of Classification Search
CPC ...... B41J 2/04561; B41J 2/125; B41J 2/0451; B41J 2/2142; B41J 2/0456; B41J 2/16579; B41J 2202/20; G01V 8/20; G01V 8/12
See application file for complete search history.

(56) References Cited

U.S. PATENT DOCUMENTS

| | | | |
|---|---|---|---|
| 6,471,335 B1 | 10/2002 | Gelbart | |
| 6,517,183 B2 * | 2/2003 | Bruch | B41J 2/0451 347/19 |
| 8,006,967 B2 | 8/2011 | Sleijpen et al. | |
| 8,231,098 B2 | 7/2012 | Ryaboy et al. | |
| 8,366,234 B2 * | 2/2013 | Ito | B41J 2/16579 347/14 |
| 2005/0122352 A1 | 6/2005 | Su et al. | |

FOREIGN PATENT DOCUMENTS

WO   WO-2006049711 A1   5/2006

* cited by examiner

*Primary Examiner* — Thinh H Nguyen
(74) *Attorney, Agent, or Firm* — Fabian Van Cott

(57) ABSTRACT

In one example in accordance with the present disclosure a drop detection device is described. The device includes an emitter member having a number of emitter cavities to relay a number of beams towards a number of detector cavities in a detector member. The device also includes a detector member that is spaced from the emitter member. The detector member includes a number of detector cavities to receive a number of beams from the number of emitter cavities. The device also includes a number of ribs coupled to both the emitter member and the detector member. The number of ribs space and align the emitter member and detector member and align the number of emitter cavities with the corresponding number of detector cavities.

15 Claims, 7 Drawing Sheets

DROP DETECTION WITH RIBS TO ALIGN EMITTERS AND DETECTORS

BACKGROUND

Printing devices generate various types of products. For example, a printing device can deposit a printing fluid on a media such as paper in a two-dimensional printing operation. In another example, a printing device can deposit a fluid on a bed of build material in a three-dimensional printing operation. Such devices that generate printed products, are ubiquitous in society. For example, individual users, corporations, and other organizations use printing devices to produce text or images on media such as paper. In another example a print target is a bed of build material used in three-dimensional printing. In either case printing devices include a printhead that ejects printing fluid to form the text or images on the print target. A printhead includes various chambers that receive a small amount of fluid. Due to vaporization, or a change in pressure in these small chambers, an amount of fluid is ejected out of the chamber through a nozzle to be ultimately deposited on a print target such as paper or a build material in a bed.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
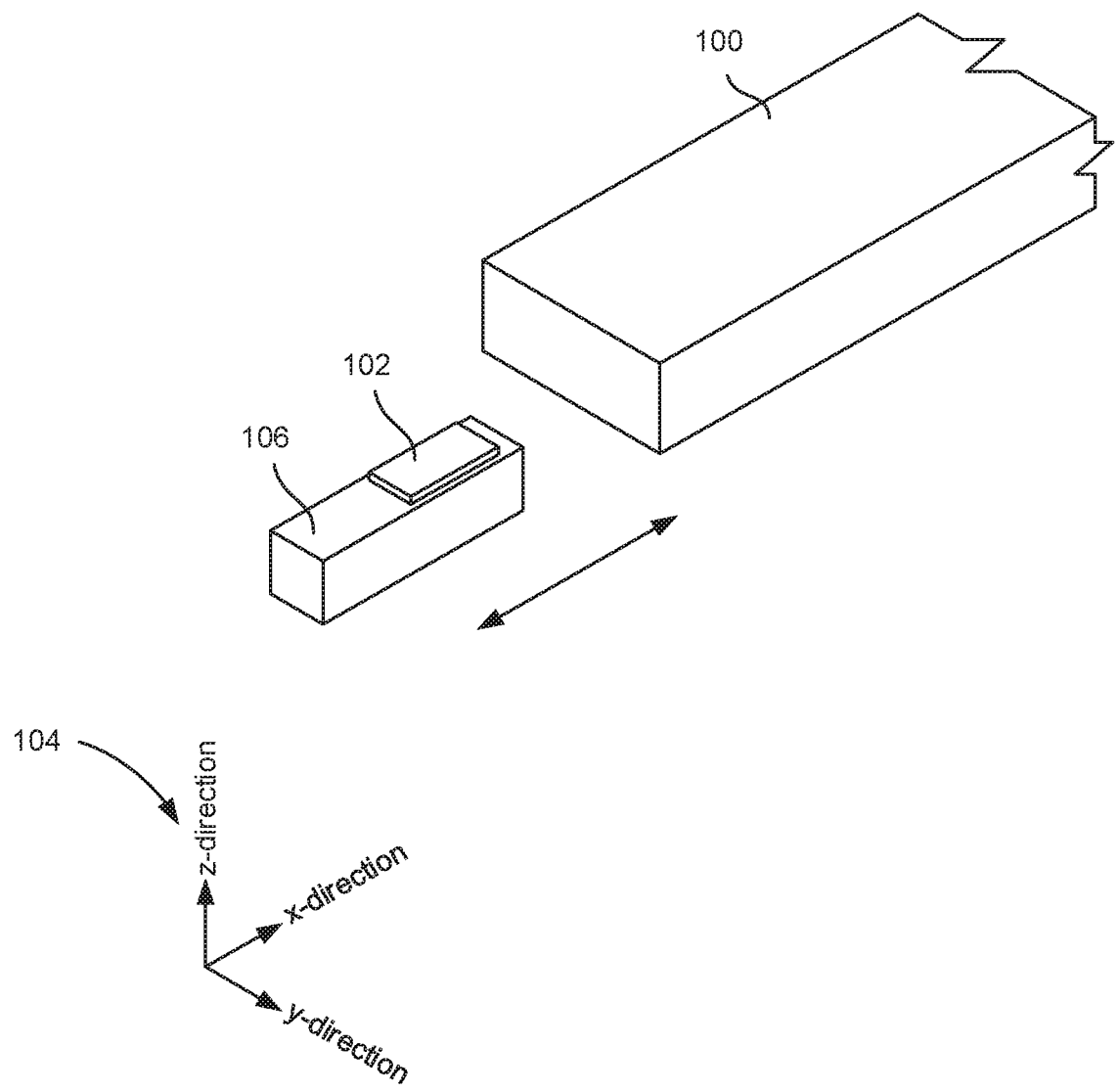
FIG. 1 is an isometric view of a drop detection device as it moves under a printhead, according to an example of the principles described herein.

Printing devices generate various types of products. For example, a printing device can deposit a printing fluid on a media such as paper in a two-dimensional printing operation. In another example, a printing device can deposit a fluid on a bed of build material in a three-dimensional printing operation. Such devices that generate printed products, are ubiquitous in society. For example, individual users, corporations, and other organizations use printing devices to produce text or images on media such as paper. In another example a print target is a bed of build material used in three-dimensional printing. In either case printing devices include a printhead that ejects printing fluid to form the text or images on the print target. A printhead includes various chambers that receive a small amount of fluid. Due to vaporization, or a change in pressure in these small chambers, an amount of fluid is ejected out of the chamber through a nozzle to be ultimately deposited on a print target such as paper or a build material in a bed.

While it is inarguable that such printing devices have been a great boon to both individual users and large entities in generating printed products, some inherent properties of the devices complicate their use. Over time the nozzles that eject printing fluid can become clogged. For example, dried printing fluid, debris, or other particulate matter can block a nozzle. In other examples of nozzle failure, internal components such as firing components, be they thermal firing resistors or piezoelectric firing components, could malfunction and prevent proper ejection of fluid from a nozzle. In yet another example of printing failure, a lack of fluid in a reservoir may lead to no ejection of the printing fluid through the nozzle.

Accordingly, the present specification describes devices and systems that can assess nozzle health by determining whether individual nozzles are ejecting fluid as intended. Specifically, the present specification describes a series of emitters that emit light towards corresponding detectors. The emitter/detector pair can determine whether a fluid, such as ink, is in fact being ejected through a nozzle. The system further includes a number of ribs that ensure that such emitters and detectors are properly spaced and aligned. The ribs can ensure accurate drop detection, even in the face of vibrations that inevitably occur during the operation of such printing devices.

In one example, the drop detection device includes an emitter member having a number of emitter cavities. In this example, the emitter cavities relay a number of emitter beams towards a corresponding number of detector cavities in a detector member. The detector member of the drop detection device is spaced away from the emitter member. The detector member includes a number of detector cavities. The detector cavities receive a number of emitter beams from a corresponding number of emitter cavities. In this example, the drop detection device also includes a number of ribs coupled to both the emitter member and the detector member. The number of ribs space and align the emitter member and detector member and align the number of emitter cavities with the corresponding number of detector cavities.

In one example, a drop detection module includes a bottom housing to support a drop detection device, which drop detection device is mounted to the bottom housing. In this example, the drop detection device includes an emitter member having a number of emitter cavities and a detector member, spaced from the emitter member, having a number of detector cavities. A number of ribs of the drop detection device are coupled to both the emitter member and the detector member to space and align the number of emitter cavities with the corresponding number of detector cavities. A top housing of the drop detection module couples to the bottom housing to enclose components of the drop detection device.

In an example a drop detection system includes an emitter member having a number of emitter cavities and a number of light emitters disposed within the number of emitter cavities. The light emitters emit a light beam towards a light detector. In this example, the system also includes a detector member, spaced from the emitter member, having a number of detector cavities and a number of light detectors disposed within the number of detector cavities. The light detectors detect when emitted light is received at the light detector. A number of ribs of the system are coupled to both the emitter member and the detector member to space and align the number of light emitters with the corresponding number of light detectors.

According to certain examples, such a drop detection device and system 1) ensures proper alignment of emitters and detectors of a drop detection device; 2) is robust against system vibration; 3) reduces the amount of drop detection devices that are rejected during a manufacturing process; and 4) ensures the quality of the system and the reliability of the drop detection device. However, it is contemplated that the devices disclosed herein may provide useful in addressing other matters and deficiencies in a number of technical areas. Therefore, the systems and methods disclosed herein should not be construed as addressing any of the particular matters.

As used in the present specification and in the appended claims, the term "print target" refers to any surface that receives a printing fluid. Examples of such print targets include two-dimensional substrates such as paper and also includes build material such as would be disposed within a bed during three-dimensional printing.

Further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. However, in other examples, the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is an isometric view of a drop detection device (102) as it moves under a printhead according to an example of the principles described herein. As described above, a printing device deposits a printing fluid on a print target. For example, print media, i.e., two dimensional paper may be stored in a tray or on a web. Upon a command from a user, the print media follows a feed path wherein the print media is moved into a print zone. The print zone defines a region within the printing device wherein printing fluid is deposited on to the print media. The print zone may be underneath a print bar (100), which print bar includes the printheads that deposit the printing fluid onto the media. As depicted in FIG. 1, the print media moves in a y-direction as indicated on the compass (104) of FIG. 1.

In another example, the print bar (100) or printhead disposed thereon, may be movable over a bed of build material, in this example the build material in the bed may be the print target.

In either case, to deposit the printing fluid onto the print target, a print bar (100) may include a number of printheads. Each printhead has multiple nozzles that eject a printing fluid stored in a reservoir onto the print target. To this end, a printhead includes a number of components. For example, the printhead may include a number of firing cells. A firing cell includes an ejector, a firing chamber, and a nozzle. The firing chamber houses a small amount of fluid. The ejector is a mechanism for ejecting fluid out of the firing chamber through the nozzle, and onto the target. The ejector may be a firing resistor or other thermal device, a piezoelectric element, or other mechanism.

For example, the ejector may be a firing resistor. The firing resistor heats up in response to an applied voltage. As the firing resistor heats up, a portion of the fluid in the firing chamber vaporizes to form a bubble. This bubble pushes fluid out the nozzle and onto the print target. As the vaporized fluid bubble pops, a vacuum pressure within the firing chamber draws fluid into the firing chamber from the fluid supply, and the process repeats. In this example, the print bar may be a thermal inkjet print bar.

In another example, the ejector may be a piezoelectric device. In this example, an applied voltage changes the shape of a piezoelectric member. This change in shape generates a pressure pulse in the firing chamber that pushes fluid out the nozzle and onto the print medium.

In either case, over time the nozzles of the printhead may become clogged. For example, dried printing fluid or other debris can clog a nozzle. Other events may lead to a malfunctioning printhead as well. For example, the ejector may malfunction leading to improper fluid ejection, or in some cases no ejection of the fluid at all. Whatever the reason, malfunctioning printheads can be frustrating to consumers and such inefficiency can limit the practical application of the corresponding printing device.

Accordingly, a drop detection device (102) can be used to assess nozzle health by measuring whether nozzles are properly firing and properly ejecting fluid onto a print target. The drop detection device includes emitter cavities disposed on an emitter member and detector cavities that are disposed on a detector member. Emitters and detectors in the respective cavities operate together to detect fluid dripping from nozzles. Ribs (208) of the drop detector device (102) ensure that the emitters and detectors are continually aligned and properly spaced apart from one another.

In the example depicted in FIG. 1, the drop detection device (102) is loaded onto a service carriage (106). The service carriage (106) moves transverse relative to an axis along which the nozzles of the printhead are aligned. In this example, the service carriage (106) moves under the printhead to determine the health of different nozzles. As in FIG. 1, the service carriage (106) is smaller than the print bar (100) such that the drop detection device (102) of the service carriage (106) assesses the health of a subset of the nozzles of the printhead. In some examples, the service carriage (106) on which the drop detection device (102) is mounted can carry out other functions. For example, the service carriage (106) may include a wiper which cleans off the nozzles to ensure a longer operational life of the nozzles.

Figure 2:
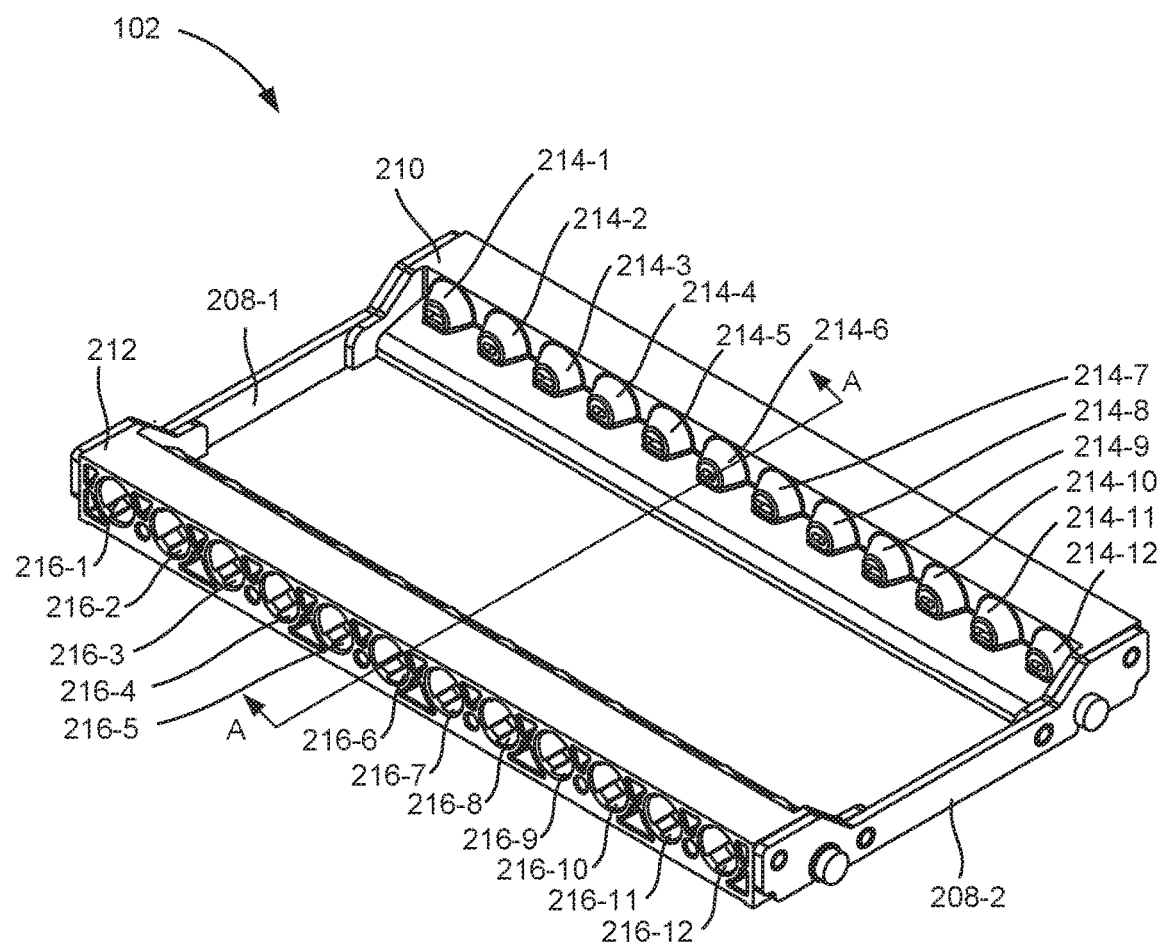
FIG. 2 is an isometric view of a drop detection device with ribs to align emitters and detectors, according to an example of the principles described herein.

FIG. 2 is an isometric view of a drop detection device (102) with ribs (208-1, 208-2) to align emitters and detectors, according to one example of the principles described herein. As described above, drop detection can be used to assess the health of nozzles. In one example, an emitter emits a beam of light, which passes to a detector. As a drop of fluid passes through the beam of light, it interrupts the beam creating a "shadow," or dark spot on the detector. This shadow can be used to determine the presence of a drop that has been ejected from a nozzle. Through the detection of such shadows, a drop detection system can determine whether nozzles are correctly ejecting fluid.

The drop detection device (102) includes an emitter member (210) and a detector member (212). The emitter member (210) has a number of emitter cavities (214) to relay a number of emitter beams toward a corresponding number of detector cavities (216) in the detector member (212). In a drop detection system, emitters are deposited within the emitter cavities (214) and detectors are deposited within the detector cavities (216). Each of the emitter cavities (214) corresponds to a detector cavity (216) in a pair-wise fashion. For example, a first emitter cavity (214-1) allows a beam from a first emitter to pass to a first detector cavity (216-1) to be ultimately received by a first detector. While FIG. 2 depicts members (210, 212) with twelve cavities (214-1-214-12, 216-1-216-12), each member (210, 212) may include any number of cavities (214, 216). The members (210, 212) may be formed of any appropriate material. For example, the members (210, 212) may be formed of a plastic or a metallic material. Such material may provide rigidity to the structure, thus for example, may provide robustness during the manufacturing process and during operation to assess nozzle health.

The emitter member (210) and the detector member (212) can be small in size relative to the size of the printhead that they are used to evaluate. For example, in the example depicted in FIG. 2, as there twelve cavities depicted which correspond to twelve emitter/detector pairs, each member (210, 212) may be the length of twelve nozzles. As for a width, the emitter member (210) and detector member (212) may each be 20 millimeters wide. With such a small width, the members (210, 212) may be susceptible to bending or otherwise being displaced. Accordingly, the drop detection device (102) of the present specification includes a number of ribs (208). On one end, the ribs (208) are coupled to the emitter member (210) and on the other end are coupled to the detector member (212). In other words, the ribs (208) space the emitter member (210) and the detector member (212) to form a gap between the emitter member (210) and the detector member (212). It is through this gap between the emitter member (210) and the detector member (212) that individual droplets of fluid pass and are detectable by the emitter/detector pairs.

In addition to spacing the members (210, 212), the ribs (208) also align the emitter member (210) and the detector member (212). For example, the ribs (208) may align the emitter member (210) and the detector member (212) parallel to one another, thereby ensuring that a beam from an emitter disposed in an emitter cavity (214) is properly directed to a detector disposed in a detector cavity (216). The number of ribs (208) may be greater than one. In other words, while FIG. 2 and other figures depict two ribs (208-1, 208-2), additional ribs may be used. Such additional ribs (not shown) may be spaced between the ribs (208) indicated in FIG. 2. Additional ribs would further stabilize the members (210, 212) and further restrict relative motion of the emitter member (210) and the detector member (212).

While FIG. 2 depicts the emitter member (210), the detector member (212), and the various ribs (208) as separate components, in some examples, these components may form a single-piece body. Meaning that the emitter member (210), detector member (212), and the various ribs (208) may be formed of a single material. Doing so would further add to the rigidity of the drop detection device (102) as a whole.

The ribs (208) may be formed of a rigid material such as metal. Doing so ensures their alignment even in the face of manipulation by a user or other system environmental conditions. For example, during use, electrical leads to and from the emitters and detectors that are deposited in the respective cavities (214, 216) are bent so as to be directed to controlling circuitry. Such bending of the leads can affect the alignment of the emission beams were the rigid ribs (208) not used. Accordingly, the rigid ribs (208) provide robustness to the alignment of the emitters/detectors in the face of various situational conditions.

Including the ribs (208) in the drop detection device (102) can improve the rigidity and stability of the drop detection operation, during manufacture and operation. After manufacturing, drop detection devices (102) may be subject to testing prior to introduction into the market to ensure their quality. If a drop detection device (102) fails this testing, it is re-worked, recycled, or thrown out. A drop detection device (102) may fail a test for any number of reasons including the aforementioned situational conditions, i.e., attachment of leads, bending of leads, small footprint of individual members, and system vibration. However, as described above, the rigid ribs (208) add stability against such environmental conditions and thus may decrease the likelihood that an individual drop detection device (102) will fail a test, and therefore may increase the yield of the manufacturing process.

During operation, these same environmental conditions can affect the performance of drop detection devices (102). More specifically, if the emitters and detectors are misaligned, then improper drop detection occurs. Such improper drop detection could lead to false positives and false negatives regarding nozzle health which can negatively impact performance, efficiency, and customer satisfaction. Accordingly, the rigid ribs (208) in preventing this type of condition improve the efficiency, reliability, and quality of the drop detection device (102).

Figure 3:
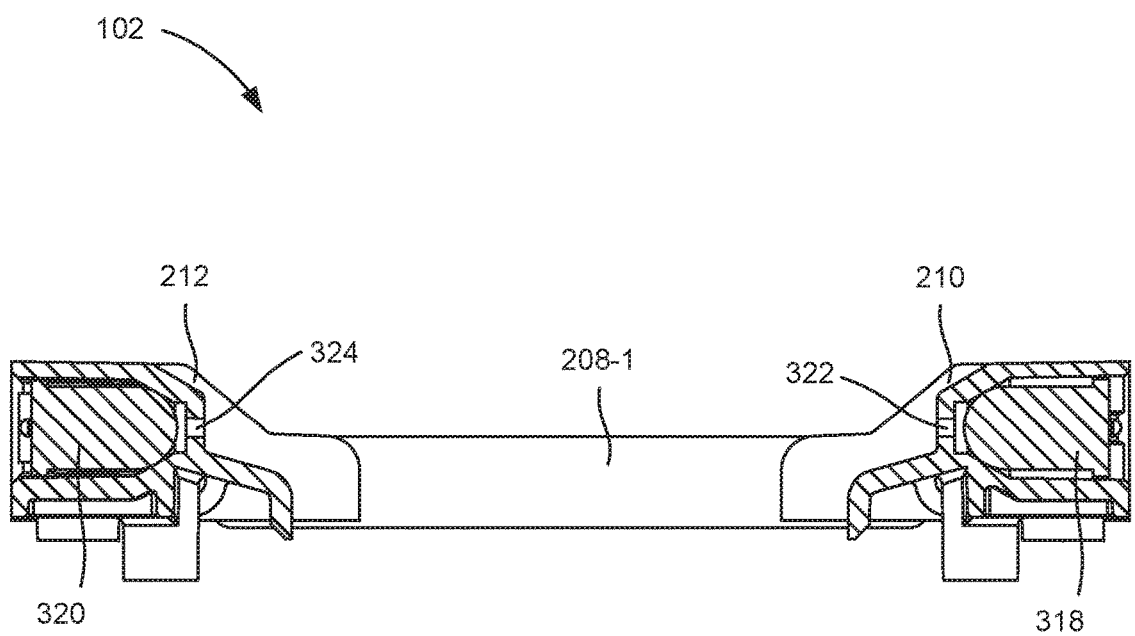
FIG. 3 is a cross-sectional view of a drop detection device with ribs to align emitters and detectors, according to an example of the principles described herein.

FIG. 3 is a cross-sectional view of a drop detection device (102) with ribs (208) to align emitters (318) and detectors (320), according to an example of the principles described herein. Specifically, FIG. 3 is a cross-sectional diagram taken along the line A-A from FIG. 2. As can be seen in FIG. 3, the emitter cavities (FIG. 2, 214) are sized to receive an emitter (318), which emitter (318) can be any device that emits a beam of light. An example of an emitter (318) is a light emitting diode (LED) however various types of emitters may be implemented in accordance with the principles described herein. Each emitter cavity (FIG. 2, 214) has an opening (322) through which the beam of light from a corresponding emitter (318) passes. Similarly, the detector cavities (FIG. 2, 216) are sized to receive a detector (320), which detector (320) can detect the presence of light. An example of a detector (320) is a photo diode, however various types of detectors may be implemented in accordance with the principles described herein. Each detector cavity (FIG. 2, 216) has an opening (324) through which the beam of light emitted from a corresponding emitter (318) can pass through to the detector (320).

FIG. 3 also depicts the first rib (208-1) which is attached to both the emitter member (210) and the detector member (212) and which is used to ensure the emitters (318) and detectors (320) remain aligned throughout the manufacturing/assembly process as well as during the operational life of the device (102).

Figure 4A:
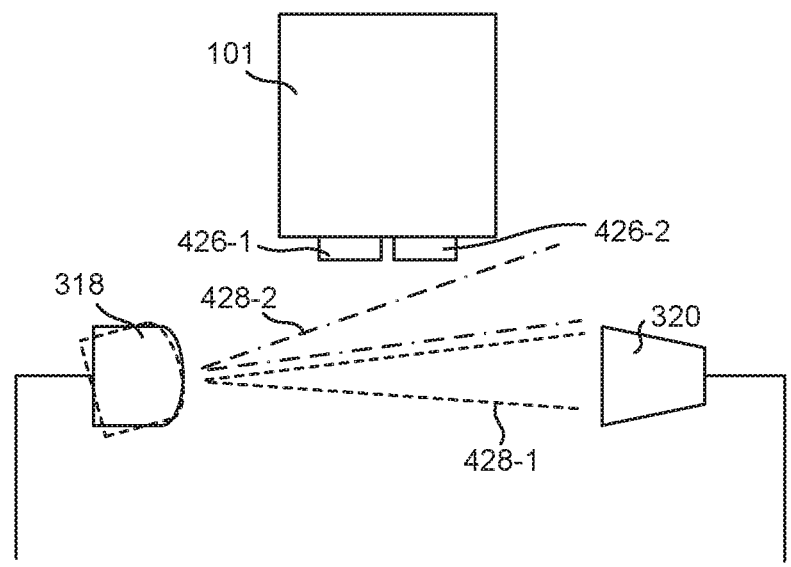
FIGS. 4A and 4B are cross-sectional views of the drop detection device detecting the ejection of fluid from a nozzle, according to an example of the principles described herein.
Figure 4B:
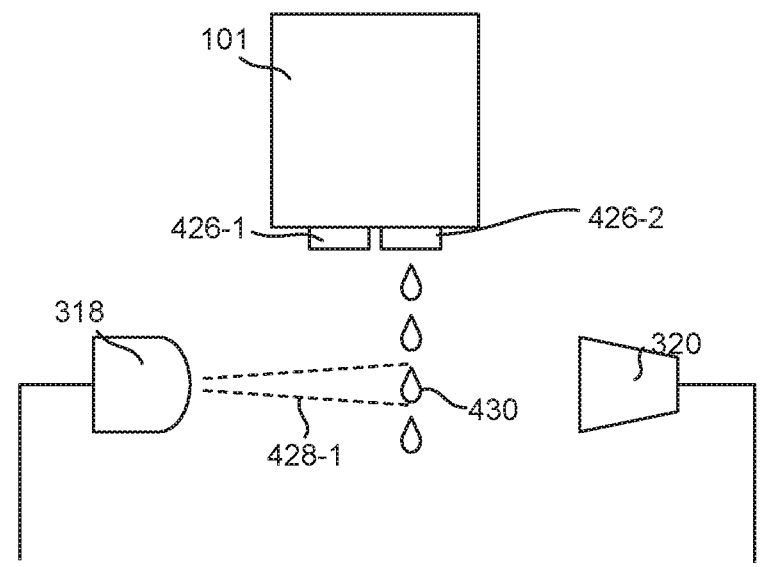

FIGS. 4A and 4B are cross-sectional views of the drop detection device (FIG. 1, 102) detecting the ejection of fluid (430) from a nozzle (426), according to one example of the principles described herein. As described above, the print bar (FIG. 1, 100) includes a printhead (101) that has a number of nozzles (426) which nozzles operate to eject fluid (430) onto a target surface. As also described above, the drop detection device (FIG. 1, 102) of the present specification can move under the printhead (101) such that the drops of fluid (430) pass through the gap between an emitter (318) and a detector (320) of the drop detection device (FIG. 1, 102). More specifically, to detect a passing drop of fluid (430), an emitter (318) emits a beam of light (428-1), which beam of light is indicated in FIGS. 4A and 4B by dashed lines. Accordingly, the emitter (318) may be any device that emits a beam of light (428-1). Examples of emitters (318) include lasers and light emitting diodes (LEDs) among other light sources. A detector (320) spaced apart from the emitter (318) receives the emitted beam of light (428-1) or other energy. For example, a detector (320) that receives the beam of light (428-1) may be a photo diode.

As depicted in FIG. 4A, when a drop of fluid (430) is not passing through the beam (428-1), the beam (428-1) is received, uninterrupted, at the detector (320). However, as depicted in FIG. 4B when a drop of fluid (430) is emitted from the printhead (101), the drop interrupts the beam (428-1) path, creating a shadow, or dark spot on the detector (320). The detector (320) upon detecting a dark spot, can thereby detect the presence of fluid (430) dropping from a nozzle (426) of the printhead (101). The emitter/detector pair can assess the health of the nozzles (426) and the larger printhead (101) be determining whether such drops of fluid (430) are detected and/or the regularity with which the drops of fluid (430) are detected.

Given that such operations are performed on a very small physical scale, precision and accuracy of the drop detection system is significant. Were the rigid ribs (FIG. 2, 208) not used, and the emitter (318) were canted up, due for example to the bending of emitter (318) leads, the beams emitted from the emitter (318) would also cant up as indicated in FIG. 3A by double-dashed lines (428-2). Any misalignment of the emitter/detector pair could result in erroneous drop detection and in some cases if a beam of light were to completely miss the detector (320) as depicted in FIG. 4A, could result in no drop detection at all.

Figure 5:
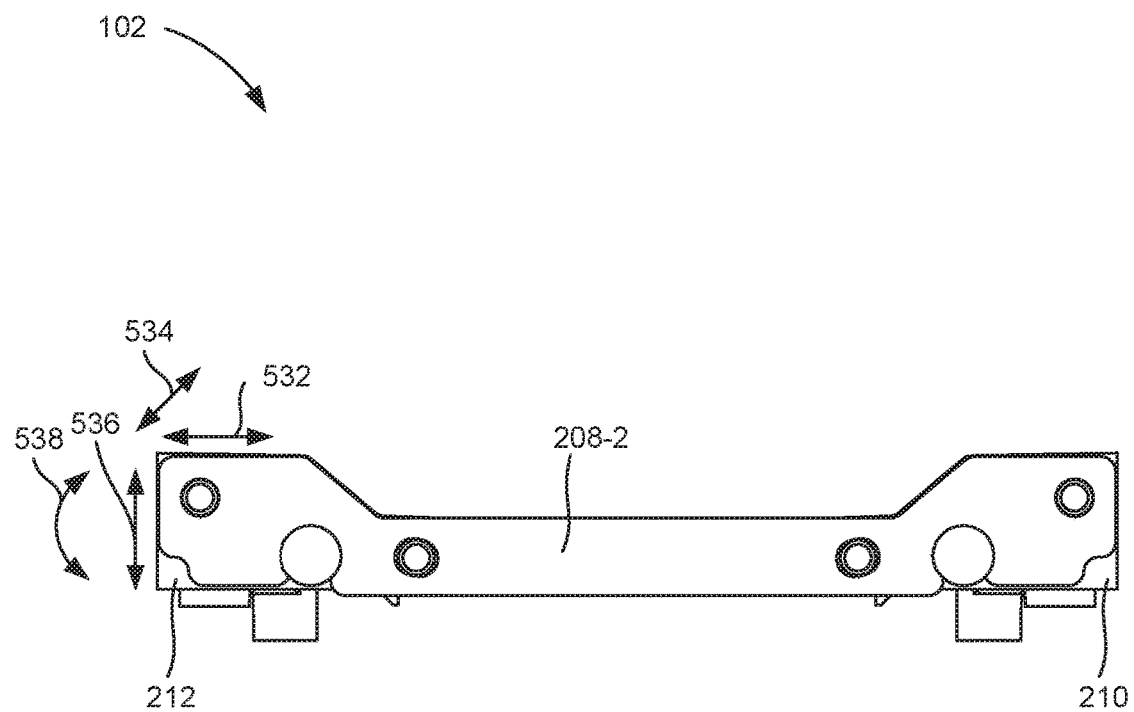
FIG. 5 is a side view of a drop detection device with ribs to align emitters and detectors, according to an example of the principles described herein.

FIG. 5 is a side view of a drop detection device (102) with ribs (208) to align emitters (FIG. 3, 318) and detectors (FIG. 3, 320), according to an example of the principles described herein. As described above, the ribs (208) that are along the side of the different members (210, 212) prevent the relative motion of the emitter member (210) and the detector member (212). More specifically, the number of ribs (208) restrict the relative motion of the emitter member (FIG. 2, 210) in three orthogonal directions, indicated by the arrows 532, 534, 536) relative to the detection member (212). In other words, the members (210, 212) do not move closer to or farther away from one another in any of the first direction (532), second direction (534), and the third direction (536), which may correspond to an x, y, and z direction.

By restricting this relative motion, the drop detection device (102) affords high precision and repeatability of drop detection operations. The restricted relative motion afforded by the ribs (208) assures that an original alignment can be maintained notwithstanding outside influences such as forces from emitter (FIG. 3, 318) and detector (FIG. 3, 320) leads and vibrations within the printing device. In addition to restricted relative translation along axes, the ribs (208) also prevent rotation about at least one, and in some examples multiple, axis as indicated by the arrow (538).

Figure 6A:
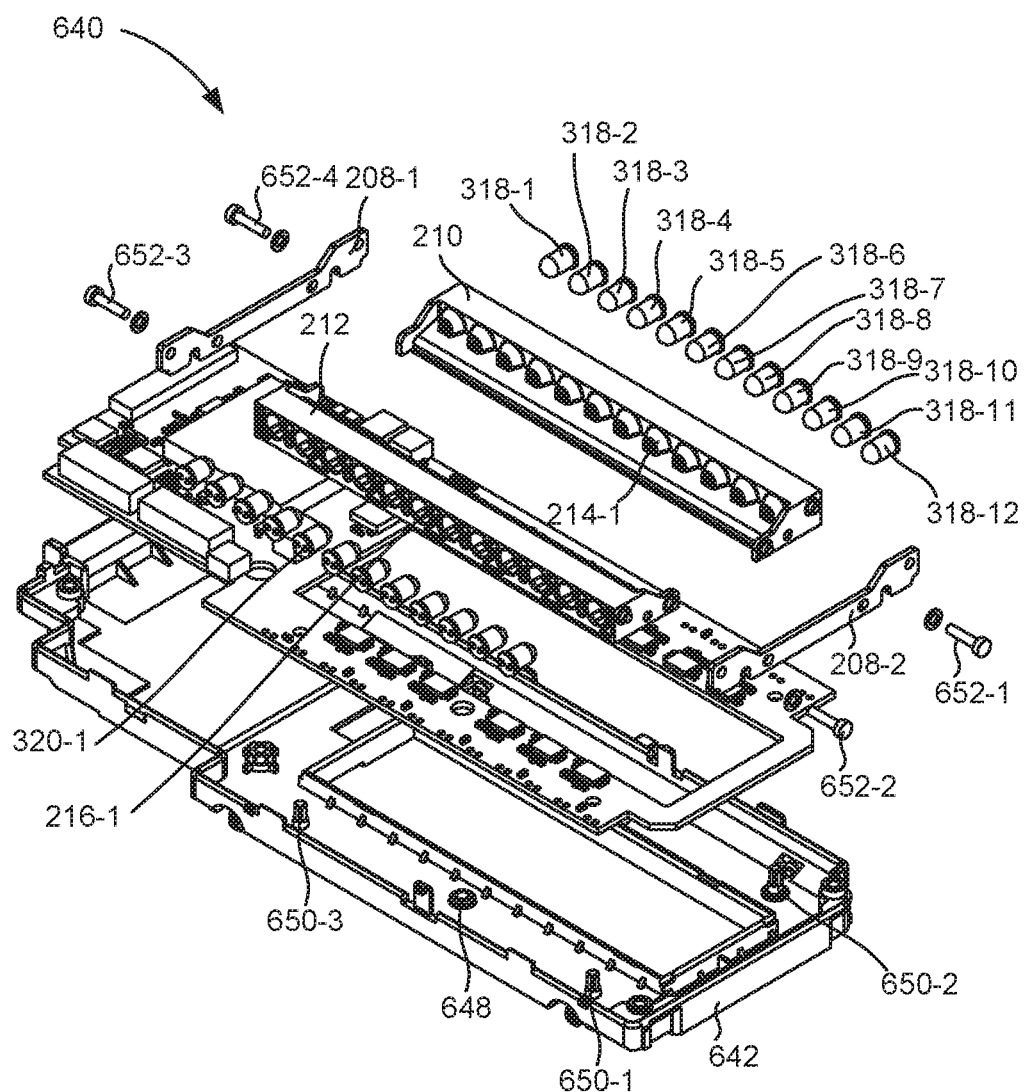
FIGS. 6A and 6B are views of a drop detection system according to an example of the principles described herein.
Figure 6B:
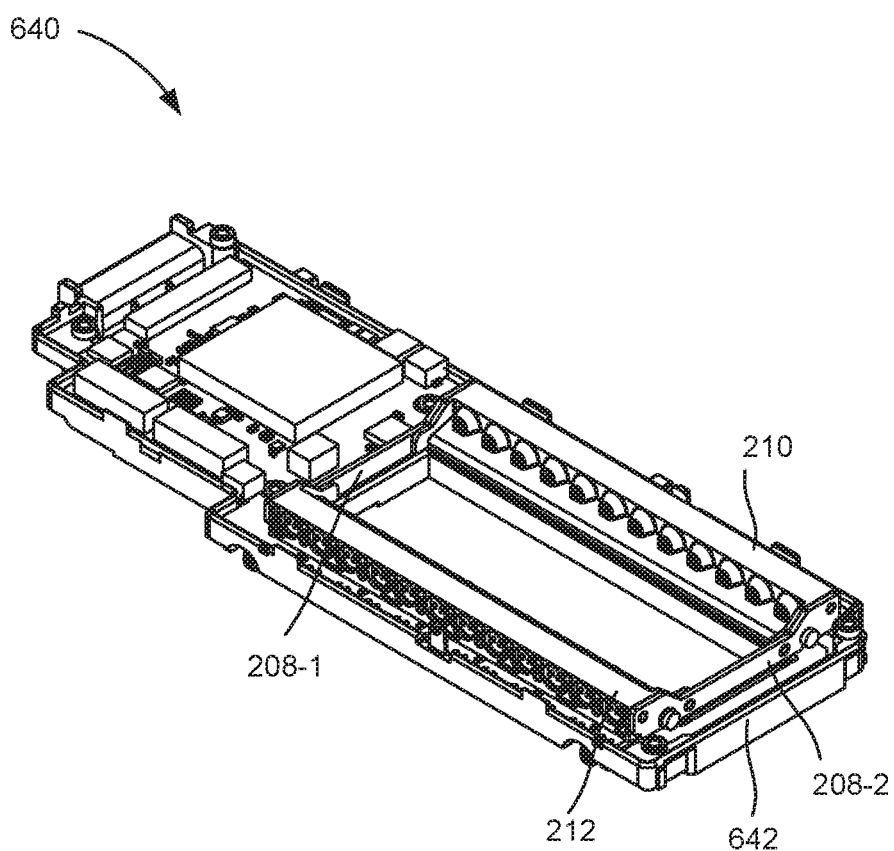

FIGS. 6A and 6B are views of a drop detection system (640), according to an example of the principles described herein. Specifically, FIG. 6A is an exploded view and FIG. 6B is an assembled view. The system (640) includes the drop detection device (FIG. 1, 102) and its constituent components, the emitters (318) and detectors (320) disposed therein, as well as a supporting module that houses the drop detection device (FIG. 1, 102).

In some examples, the drop detection device (FIG. 1, 102) is included in a module. Such a module may be disposed on a service carriage (FIG. 1, 106), such as the carriage within a printing device. The module includes a bottom housing (642) to support the drop detection device (FIG. 1, 102). Moreover, as will be described below, the bottom housing (642) includes some components to aid in the alignment of the drop detection device (642) with the nozzles (FIG. 4, 426) which are to be inspected. The drop detection device (FIG. 1, 102) is mounted onto the bottom housing (642). Specifically, the emitter member (210), detector member (212), and ribs (208) are mounted onto the bottom housing (642). As described above, the drop detection device (FIG. 1, 102) includes an emitter member (210) having a number of emitter cavities (214-1-214-12) and a detector member (212) having a number of detector cavities (216-1-216-12). The drop detection device (FIG. 1, 102) also has a number of ribs (208-1, 208-2) coupled to both the emitter member (210) and the detector member (212) to space and align the number of emitter cavities (214-1-214-12) with the corresponding number of detector cavities (216-1-216-12). For simplicity, one emitter cavity (214-1), one detector cavity (216-1), and one detector (320-1) are indicated with reference numbers.

The module also includes a top housing that couples to the bottom housing (642) and encloses components of the drop detection system (640). For example, in addition to the different members (210, 212), cavities (214, 216), and ribs (208) the drop detection system (640) may also include components such as circuitry, leads, input/output ports and other components that assist in the operation and control of the emitter/detector pairs. For example, the system (640) may include a control device that receives data indicative that a detector (320) has detected a dark spot. The control device uses this information to assess the health of the nozzles (FIG. 4, 426) which information can be passed on to other systems. It may be desirable to keep such components free of debris or printing fluid that may splatter. Accordingly, the top housing of the module encloses such components and prevents unwanted contamination of such components.

To ensure the rigidity of the drop detection device (FIG. 1, 102) within the module, a module attachment device (648) of the system (640) couples the drop detection device (FIG. 1, 102) to the bottom housing (642). Examples of such module attachment devices (648) include rivets, snaps, screw holes, or other attachment devices that secure the drop detection device (FIG. 1, 102) securely to the bottom housing (642). While FIG. 6A depicts one such module attachment device (648) any number of attachment devices (648) may be implemented in accordance with the system (640) described herein.

Additionally, to further ensure the alignment, and to prevent the x-direction motion of the emitter member (210) relative to the detector member (212), a number of alignment devices (650-1, 650-2, 650-3) align the drop detection device (FIG. 1, 102) to the bottom housing (642). An example of such alignment devices (650) are posts on the bottom housing (642) that are received into holes of the drop detection device (FIG. 1, 102). For another example, the holes could be on the bottom housing (642) and could receive posts located on the drop detection device (FIG. 1, 102).

As described above, the ribs (208) are rigidly and fixedly attached to the emitter member (210) and the detector member (212). To facilitate this rigid attachment, rib attachment devices (652) couple the ribs (208) to each of the emitter member (210) and the detector member (212) to fixedly align the number of emitter cavities (214-1-214-12) and a corresponding number of detector cavities (216-1-216-12). For example, adjacent holes on the ribs (208) and members (210, 212) may align and a rivet placed through the holes to secure ribs (208) in place against the members (210, 212). Note that while FIG. 6A depicts two rib attachment devices (652-1, 652-4) corresponding to the emitter member (210) and two rib attachment devices (652-2, 652-3) corresponding to the detector member (212), any number of rib attachment devices (652) may be used. Additional rib attachment devices (652) would serve to further couple the emitter member (210) movement to the detector member (212) movement.

In addition to the module described herein, the system (640) also includes a number of light emitters (318-1-318-12) disposed within the number of emitter cavities (214-1-214-12). The light emitters (318) emit light towards a light detector (320). Accordingly, the system (640) also includes a number of light detectors (320-1-320-12) disposed within the number of detector cavities (216-1-216-12) to determine whether light is interrupted by fluid (FIG. 4, 428) or not. Light being received at a particular detector (320) indicates that no fluid (FIG. 4, 428) is interrupting the beam path and may be indicative of a malfunctioning nozzle (FIG. 4, 426) or other component of the printhead (FIG. 1, 101). The absence of light being received at the particular detector (320) indicates that a drop of fluid (FIG. 4, 428) has interrupted the beam path and may be indicative of a healthy nozzle (FIG. 4, 426). The detector (320) can pass any gathered information to a control device which determines whether or not fluid is appropriately dripping from a corresponding nozzle (FIG. 4, 426).

As described above, such a system (640) ensures the precision and accuracy of drop detection operation. Moreover, as there is rigidity and robustness built into the device, there is less likelihood of rejections during the manufacturing operation and increased reliability during use.

FIG. 6B is an assembled view of the system (640). As can be seen in FIG. 6B, the emitter member (210) and the detector member (212) are separated and the corresponding emitters (318) and detectors (320) disposed within the corresponding cavities (FIG. 2, 214, 216) so as to simultaneously detect drops of fluid (FIG. 4, 428) from various nozzles. For simplicity, in FIG. 6B, some of the reference numbers have been removed.

According to certain examples, such a drop detection device and system 1) ensures proper alignment of emitters and detectors of a drop detection device; 2) is robust against system vibration; 3) reduces the amount of drop detection devices that are rejected during a manufacturing process; and 4) ensures the quality of the system and the reliability of the drop detection device. However, it is contemplated that the devices disclosed herein may provide useful in addressing other matters and deficiencies in a number of technical areas. Therefore, the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A drop detection device comprising:
an emitter member having a number of emitter cavities to relay a number of beams towards a corresponding number of detector cavities in a detector beam;
a detector member, spaced away from the emitter member, having a number of detector cavities to receive the number of beams from the number of emitter cavities; and
a number of ribs coupled to both the emitter member and the detector member to:
space and align the emitter member and detector member; and
align the number of emitter cavities with the corresponding number of detector cavities.

2. The device of claim 1, wherein the number of ribs align the emitter member and the detector member parallel to one another.

3. The device of claim 1, wherein the emitter member, the detector member, and the number of ribs form a single-piece body.

4. The device of claim 1, wherein the number of ribs to space the emitter member and the detector member is greater than one.

5. The device of claim 1, wherein the device is disposed on a service carriage of a printing device.

6. The device of claim 1, further comprising:
a number of light emitters disposed within the number of emitter cavities; and
a number of light detectors disposed within the number of detector cavities.

7. The device of claim 1, wherein the number of ribs restrict motion of the emitter member in three orthogonal directions relative to the detector member.

8. The device of claim 1, wherein the number of ribs restrict rotation of the emitter member and the detector member relative to an axis.

9. A drop detection module comprising:
a bottom housing to support a drop detection device; and
a drop detection device mounted to the bottom housing, the drop detection device comprising:
an emitter member having a number of emitter cavities;
a detector member, spaced from the emitter member, having a number of detector cavities; and
a number of ribs coupled to both the emitter member and the detector member to space and align the number of emitter cavities with the corresponding number of detector cavities.

10. The drop detection module of claim 9, wherein the module passes under a printhead to detect fluid ejection from nozzles of the printhead.

11. The drop detection module of claim 9, further comprising a number of module attachment devices to attach the drop detection device to the bottom housing.

12. The drop detection module of claim 9, further comprising a number of alignment devices to align the drop detection device to the bottom housing.

13. The drop detection module of claim 9, wherein the drop detection device simultaneously detects fluid drops from multiple nozzles.

14. A drop detection system comprising:
an emitter member having a number of emitter cavities;
a number of light emitters disposed within the number of emitter cavities to emit beams of light towards a light detector;
a detector member, spaced from the emitter member, having a number of detector cavities that correspond to the number of light emitters;
a number of light detectors disposed within the number of detector cavities to detect when the beams of light are received at the light detector; and
a number of ribs coupled to both the emitter member and the detector member to space and align the number of light emitters with the number of light detectors.

15. The system of claim 14, further comprising rib attachment devices to fixedly attach the number of ribs to the emitter member and the detector member.

* * * * *